US005252953A

United States Patent [19]
Sandrew et al.

[11] Patent Number: 5,252,953
[45] Date of Patent: Oct. 12, 1993

[54] COMPUTERGRAPHIC ANIMATION SYSTEM

[75] Inventors: Barry B. Sandrew; David Hamby, both of Encinitas, Calif.

[73] Assignee: American Film Technologies, Inc., Wayne, Pa.

[21] Appl. No.: 526,977

[22] Filed: May 22, 1990

[51] Int. Cl.$^5$ ............................................. G09G 1/06
[52] U.S. Cl. ................................. 345/122; 345/203
[58] Field of Search ............... 340/723, 724, 725, 750, 340/799, 793, 703, 729, 728, 747; 358/81; 364/521; 395/152, 153

[56] References Cited

U.S. PATENT DOCUMENTS

| | | |
|---|---|---|
| 3,731,995 | 5/1973 | Reiffel . |
| 4,189,473 | 2/1980 | Schure et al. . |
| 4,189,744 | 2/1980 | Stern . |
| 4,475,104 | 10/1984 | Shen ..................................... 340/703 |
| 4,600,919 | 7/1986 | Stern .................................... 340/725 |
| 4,700,181 | 10/1987 | Maine et al. ......................... 340/724 |
| 4,760,390 | 7/1988 | Maine et al. ......................... 340/725 |
| 4,827,255 | 5/1989 | Ishii .................................... 340/793 |
| 4,918,624 | 4/1990 | Moore et al. ........................ 340/767 |
| 4,952,051 | 8/1990 | Lovell et al. ........................ 340/725 |

OTHER PUBLICATIONS

"The Last Frontier:Getting Computers in Character" The Hollywood Reporter; Charles Solomon; Wednesday, Jan. 25, 1989; Animation Special Report; pp. 5-17 to 5-18.

"Hanna-Barbera's Morning 'Toons" Step-By-Step Graphics; Rita Rigby; Nov./Dec. 1988; pp. 82-89.

Primary Examiner—Ulysses Weldon
Assistant Examiner—Regina Liang
Attorney, Agent, or Firm—Ratner & Prestia

[57] ABSTRACT

There is provided a system and method for a computerized animation system comprising a series of images stored in a memory storage structure. These images are comprised of picture elements, and the memory storage structures comprise a plurality of bit planes, which are further divided into at least two storage structures. A first storage structure is used for storing operator-modified image information in a vector representation, and a second storage structure is used to store a raster representation of the operator-modified image information. The system can display multiple images from the second storage structure to facilitate the creation of additional images.

17 Claims, 12 Drawing Sheets

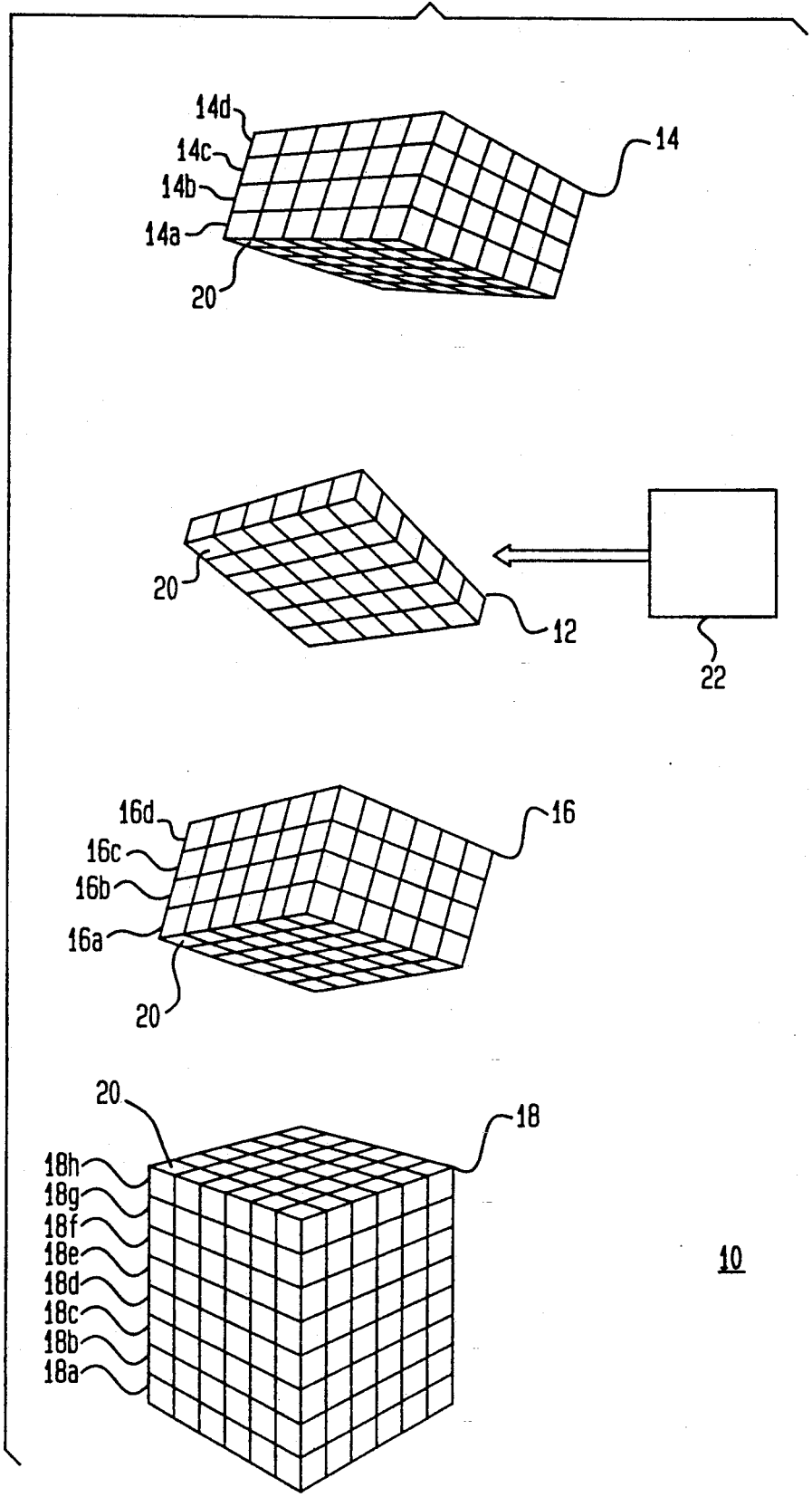

FIG. 2
A.
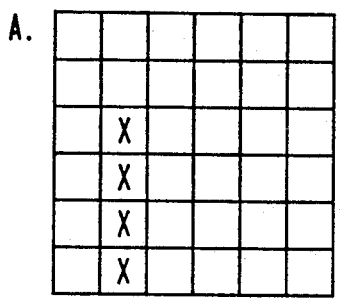 → 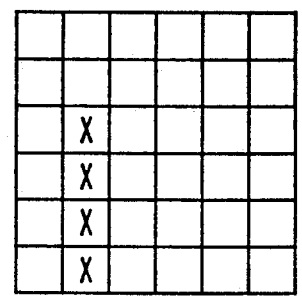
9     16a
B.
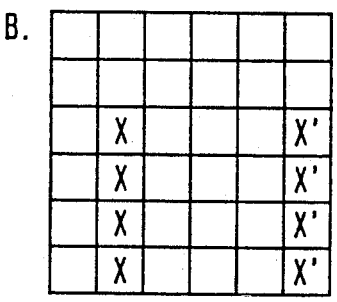 → 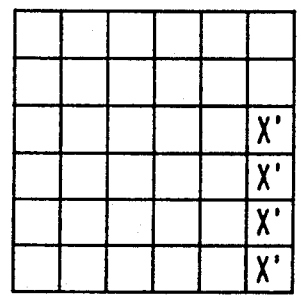
9     16b
C.
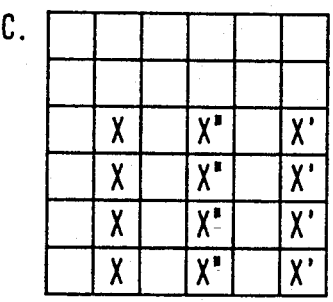 → 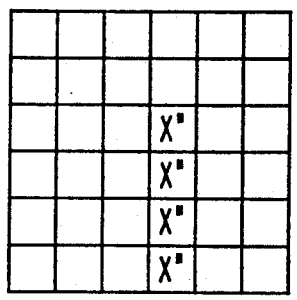
9     16c

FIG. 3
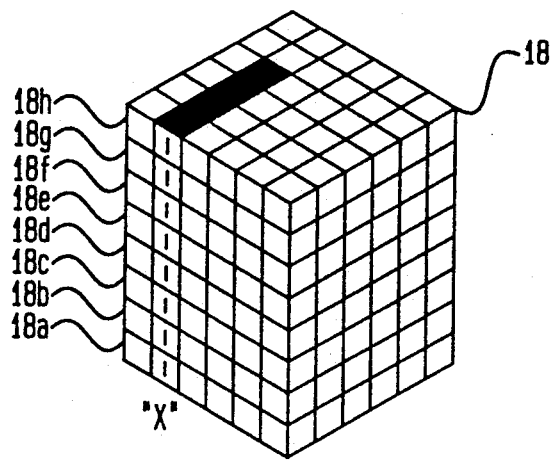
A.
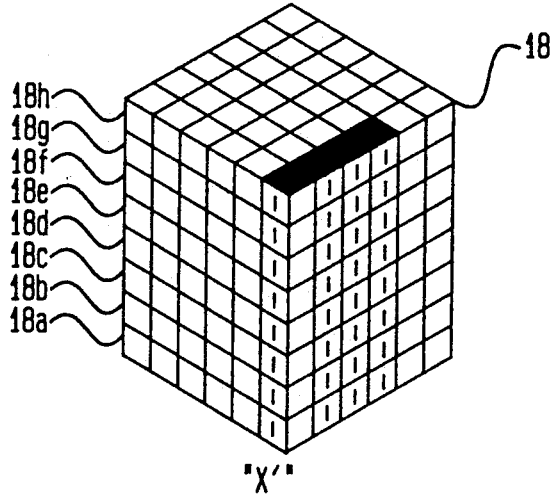
B.
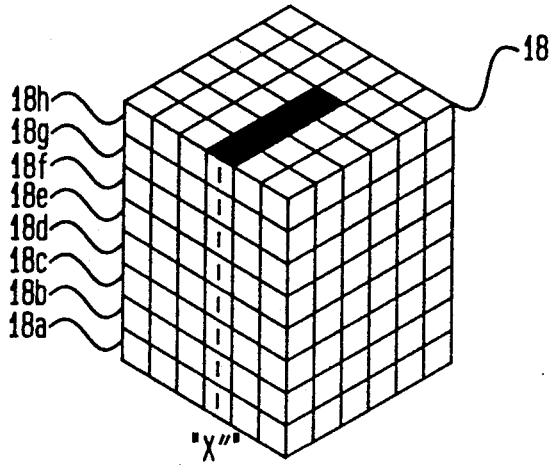
C.

FIG. 4
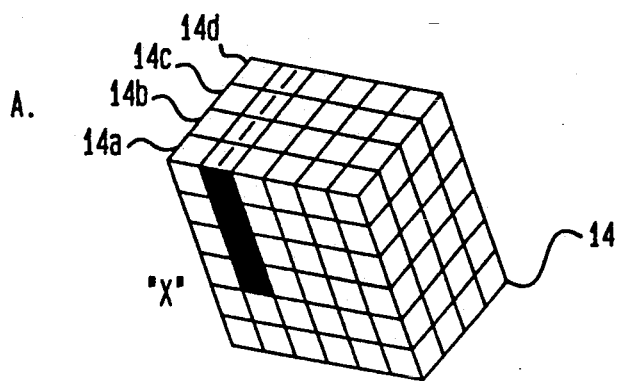
A. "X"
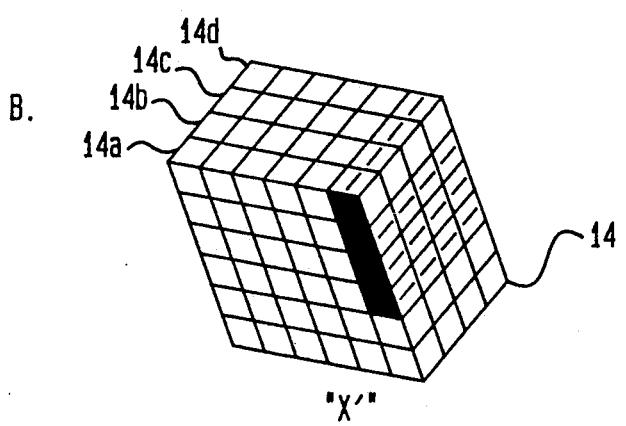
B. "X'"
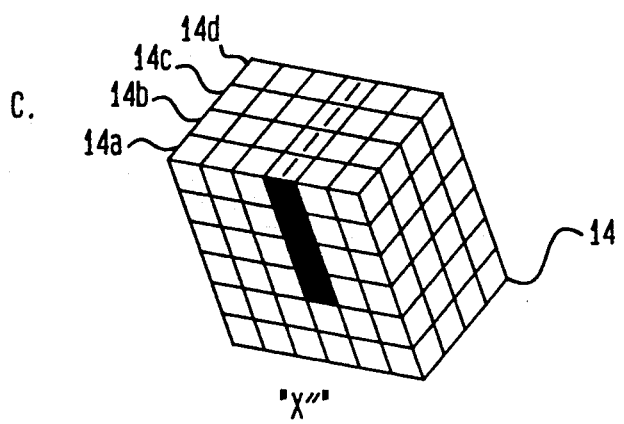
C. "X''"

COMPUTERGRAPHIC ANIMATION SYSTEM

BACKGROUND OF THE INVENTION

Animation is a process by which a series or sequence of hand or computer drawn images are combined in such a way as to appear to the viewer that an image or multiple images have moved from one frame to another. As films and videos are actually a sequence of still pictures linked together, it is necessary to relate the images from one frame to another so that the transition appears fluid when shown at the speed of the final product (30 frames per second for video).

The most prevalent animation technique is called cell animation. In cell animation, various layers or "cells" are hand drawn by animators on transparencies (or on paper which is later transferred to a transparency), depending on the stage of the process. Typically, each cell tracks an individual object. This type of a system is referred to as a "paper" system.

For a typical cell animation application, the first step is to draw the image in stick or outline form for the first frame. Next, this image is redrawn as it would appear a number of frames into the future. For purposes of example, this future frame is nine frames into the future. After these two frames are drawn, the "in-betweening" step takes place. Here, the "in-betweener" begins by drawing the frame which occurs in the middle of frames 1 and 9 (frame 5). After this step, the frame between the extreme frame and the first in-between frame (frames 1 and 5) is drawn, and so on until all of the images occurring in successive frames (1 to 9) have been drawn. In-betweening in paper systems is accomplished with backlit paper, so that the outer frames are in the in-betweener's view when he or she is drawing the in-between frames.

The first pass of "in-betweening," called pencil testing, is usually drawn in pencil or on individual pieces of paper that are pin registered. The paper drawings are then videotaped for viewing the accuracy of the animation. This allows for verification of lip synching, expression and movement of the elements of a set of frames. The next pass is called inking, where the pencil drawing is traced with clean lines drawn in ink. The third step involves photocopying, followed by hand painting, and the final step of compositing. In compositing, all of the cells (layers comprising each animated image) for an individual frame are stacked on top of one another and photographed to make up each frame for the animated sequence. Traditional cell animation uses approximately three layers (transparencies), where each layer is considered a "cell." Each cell is drawn in outline form, and then turned over and painted from the back. Next, each cell is layered, one on top of another, to produce a final image on film. In reality, though three layers are involved, there may actually be four or five cells produced. This is because each layer may itself involve multiple cells.

To produce high quality and more realistic animation, it is always essential to have the animated images track the sound or speaking with which the images will be displayed. To ensure this identity between sounds and images, the soundtrack and speaking parts are usually recorded prior to the animated images, and the animator, in creating the images, tracks the sound. This means that, as an animated character is speaking, the animator draws the mouth and facial expressions to sync with the pre-recorded soundtrack.

There are various software programs on the market which facilitate the drawing of images. CAD (Computer Animated Design) programs use an equation to generate a series of screen pixels between two points. A CAD program, then, may represent an image being drawn as a set of vectors. The use of an equation to represent the image information allows for complicated effects, such as image manipulation, translation and rotation.

Other drawing programs work with raster-represented image information. This is also referred to as bit mapping. In this technique, an image is drawn and stored as a map of pixels on the screen. Manipulation of images is much more limited, since there is a one-to-one correlation between what is stored for each pixel and what is displayed for each pixel. This is in contrast to an equation or a vector based system, where each pixel can be altered by changing the variables in the equation.

One benefit, however, of a raster-representation system is its simplicity, as contrasted with the complex calculations occurring in a vector or graphics-based system.

SUMMARY OF THE INVENTION

The present invention involves a computerized animation system which comprises a series of images stored in various representations in a plurality of memory storage structures. The images are broken down into several components, which facilitate the creation and modification of images and the application of color thereto. The images are first drawn and modified in a vector representation. The vector represented images are then stored in a raster representation for display and creation of subsequent images. Subsequent additions or modifications to the stored raster representation are facilitated by modifications or additions of the vector representations, then restored as a new raster representation. Finally, gray scale information and color region information (which, in turn, addresses color look-up tables) is assigned to each pixel of an image. This information is then used to construct unique transfer functions to produce the final color versions of the animated images.

BRIEF DESCRIPTION OF THE FIGURES

FIG. 1 shows an expanded view of a memory structure of the present invention.

FIG. 2 shows a diagrammatic view of the use of the memory structure of the present invention in animation.

FIG. 3 shows storage in the lower memory storage structure of the present invention for a series of frames.

FIG. 4 shows storage in the upper-upper memory storage structure for a series of frames.

DETAILED DESCRIPTION OF THE INVENTION

Figure 1A:
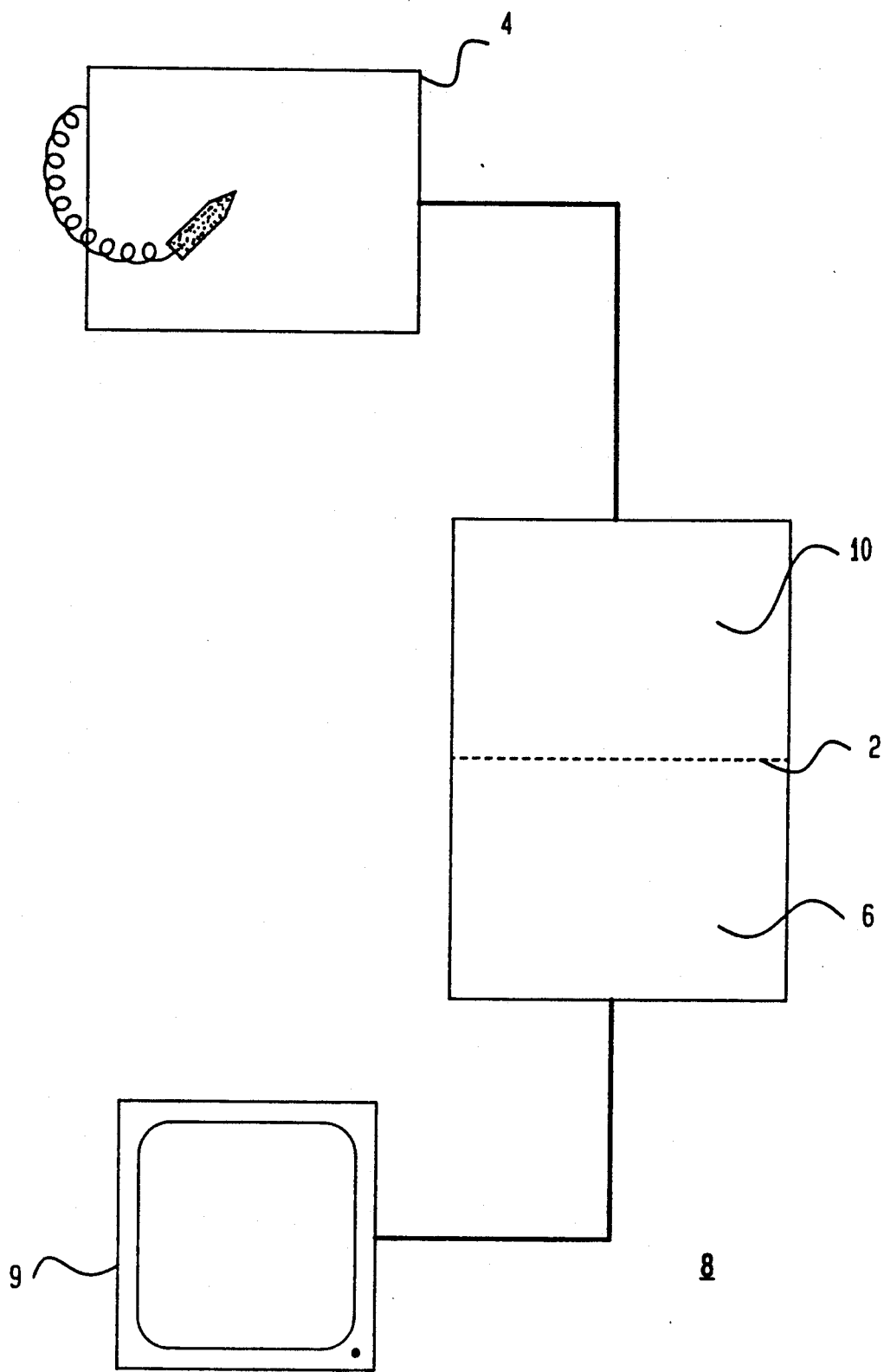
FIG. 1A is a block diagram of an apparatus in accordance with an embodiment of this invention.

There is shown in FIG. 1 a memory storage structure 10. Memory storage structure 10 comprises a lower memory storage structure 17, an upper memory storage structure 16, an upper-upper memory storage structure 14 and a vector storage structure 22. The information from vector storage structure 22 is translated into raster information and stored in memory structure 12 prior to storage in upper memory storage structure 16 and lower memory storage structure 18.

Upper memory storage structure 16 comprises a plurality of bit planes 16a–16d. Each of these bit planes is further comprised of a plurality of bits 20. Bits 20 correspond to the picture elements (pixels) which make up a visual image as it is displayed on a display device.

In memory storage structure 16, each of the bit planes 16a through 16d represent an independent (one-level of information) image. Thus memory storage structure 16 comprises four bit planes of independent information by which four monochrome images can be stored.

In the present invention, for animation, each of the four bit planes in upper memory storage structure 16 can contain an image. These images are comprised of a group of bits, and are termed raster images. Temporarily storing a raster represented image in one of the bit planes for motion reference (i.e., bit plane 16a), and then temporarily storing an image representing motion or animation of the earlier image in an additional bit plane for motion reference (i.e., bit plane 16b) allows for animation sequences to be created. Using images in this way is referred to as "ghosting" of images.

Before an image can be stored in any of the bit planes in upper memory storage structure 16, the image must first be "drawn" or created. In the present invention, images to be animated are created using a computer animation station. A block diagram of an example computer animation station 8, is shown in FIG. 1A. This animation station includes a computer 2, containing: pipeline architecture image processing hardware with a central processing unit and related hardware 6, which operates on the described memory structures 10; a digitizing device 4, such as a Sumagraphics ™ tablet; and graphics display hardware 9, such as an extended graphics adapter (EGA) monitor. The image memory is 16 bits deep, and is organized as a two-dimensional rectangular array. The horizontal dimension of the memory is 2 K words, and may be expanded. The upper and lower bytes of the memory may be addressed separately, so that two different 8-bit images can occupy the same area of memory simultaneously. One of these bytes is further divided into the two 4-bit segments comprising upper memory storage structure 16 and upper-upper memory storage structure 14. Image memory is controlled through a group of registers that physically reside on an image memory interface board. The registers are accessible through I/O ports. The five registers of control and status registers. Generally, the control register selects a mode of operation for a transfer of image data, and the address registers control the address where the data is placed.

Referring back to FIG. 1, the image to be animated is drawn in vector form with a drawing device and stored in vector files in vector storage structure 22 as a vector representation. This vector representation is a series of vector defined lines (line segments) created by the animator prior to storage in vector storage structure 22. Vector storage structure 22 can contain numerous vector files. As the vectors cannot be displayed per se, they must be translated into a raster representation and displayed in graphics bit plane 12.

Graphics bit plane 12 comprises a graphics bit plane such as an EGA bit plane. The information in graphics bit plane 12 is displayed directly on a display device, such as a computer monitor. Therefore, though the information for the image as it is being drawn is displayed in a raster format (so that the animator can see the image as an image, and not a string of numbers), the image is actually generated from a vector file stored in the host memory of the computer. Using vectors facilitates manipulation and modification of the images as they are being created, as well as after they are created.

Using an on-screen menu, the animator can store the vector represented image in one of the four bit planes of upper memory storage structure 16 selected by the animator. Storing the vector represented image in upper memory storage structure 16 displays the image in a raster represented format. In this way, each pixel of the image (an outline figure) is stored and addressable as a single bit in one of the four bit planes of upper memory storage structure 16.

Though there are four bit planes in upper memory storage structure 16 of the present invention, it should be understood by those skilled in the art that any number of bit planes could be included in upper memory storage structure 16. It should be equally well understood that not all of the bit planes in upper memory storage structure 16 need be used. The optimal use of upper memory storage structure 16 is to store images to be animated in different stages of motion so that these images can be displayed simultaneously (ghosted) so that the animator can draw or create images in-between the ghosted images. Thus, the ghosting of images serves as a reference for the animator.

Lower memory storage structure 18 contains eight bit planes in the present embodiment of the invention. As with upper memory storage structure 16, those skilled in the art will understand that lower memory storage structure 18 can contain fewer or greater number of bit planes depending on the desired memory structure design. In the present embodiment, eight bit planes are used so that 256 shades of gray (gray scale values) can be addressed and assigned to the images created.

After an animator is satisfied with the image or images which are created, gray scale values are assigned to the images. Though not necessary, it is typical for animated images to be filled, either in monochrome or in color. If the animated images are to be filled in; the animator assigns gray scale values to the different areas of the animated image, and then stores the gray scale selected image in the lower memory storage structure 18. In contrast to upper memory storage structure 16, which comprises independent bit planes, lower memory storage structure 18 comprises dependent bit planes.

These dependent bit planes comprise an eight-bit word (in the present embodiment) for each pixel. Thus, each pixel can be assigned a gray scale value from a range of 256 values.

Also of note, it is possible to store the raster representation of the image directly into the lower memory storage structure 18 instead of first storing the raster representation of the image in upper memory storage structure 16.

If the animated images are to be colored, it is still necessary to assign a gray scale value to the different regions to be assigned colors. Gray scale values are used by the color transfer function (disclosed in Applicant's related application, European Patent Office Publication No. 0,302,454, and incorporated by reference herein), which provides for the application of color to the images.

To review, the animator creates an image in a vector represented format which is stored in a vector file contained in vector storage structure 22. The vector represented image is translated into a raster representation in the graphics bit plane 12, so that it can be displayed visually as an image on a display device. This image can then be stored in a raster representation in one of the independent bit planes (16a-16d) of upper memory storage structure 16. Subsequent images, representing the image in various stages of motion, can also be stored in the additional bit planes of upper memory storage structure 16. Storing these subsequent images allows for the animator to display the images simultaneously on the display device so that, in-between, stages of the image to be animated can be drawn.

After the animator is satisfied with the images, the animator selects gray scale values to be assigned to the various regions of the images. Once the gray scale values are selected for the regions of the images, the images with the gray scale value information are stored in lower memory storage structure 18. The bit planes of lower memory storage structure 18 are dependent. In this way, each bit (pixel) of lower memory storage structure 18 contains 8 bits of information. Thus, the animator can assign a gray scale value from a range of 256 gray scale values to the regions of the images.

To facilitate the ghosting of images, the images stored in the bit planes of upper memory storage structure 16, in the preferred embodiment of the present invention, are assigned a different color, solely for display purposes. This color is wholly unrelated to the ultimate color of an image. Therefore, when the animator chooses to display multiple images from the bit planes of upper memory storage structure 16, the displayed images will appear in different colors. This allows for easier distinction on the part of the animator between the image being created and the image in its various stages of motion. As an additional aid, the animator can select the intensity of the colors to be displayed. By choosing the color and the intensity of the color for images in each of the bit planes, the animator can adapt the system to produce the most effective workspace environment.

Another tool used by the animator is the cycling tool. The cycling tool allows the animator to "run" the images in order to test for the smoothness of the animation. This is similar to the flipping of pages in a paper animation system.

In order to cycle through the images, the animator can choose either an automatic or manual mode. Automatic mode runs through the images at a preselected speed in a forward, then backward direction to maintain continuity of motion. Manual mode allows the animator to interactively choose the direction, speed and starting point (frame) for the cycling.

During cycling, each of the images stored in lower memory storage structure 17 are cycled. The present system works with 32 frames. This allows for working with more than 32 frames at a time could cycle through more than 32 frames.

In order to produce a color image (as opposed to the colors assigned to the bit planes of upper memory storage structure 16, which are used for reference purposes), the color transfer function also requires a color region value to point to the color look-up table which contains the HLS (hue, luminance, saturation) color coordinate value associated with each of the possible gray scale values (i.e., 256 in the present embodiment). Upper-upper memory storage structure 14 provides this information for the color transfer functions.

Upper-upper memory storage structure 14 contains four bit planes. In the present embodiment, then, there is a possibility of 16 different regions of color, any one of which can be addressed. Those skilled in the art will understand and recognize that fewer or greater number of bit planes can be present, yielding fewer or greater number of colors (color regions) which can be addressed. As there are four bit planes in the present embodiment, there are a total of sixteen colors which can be addressed or assigned. Each region addresses 256 different values of the hue. As in lower memory storage structure 18, the bit planes of upper-upper memory storage structure 14 are dependent in that the four bit planes comprise a four-bit word for each pixel 20 in the image.

The animator selects the color for each region and designates the region as being assigned this selected color. The color assignment to each region can be concurrent with, or separate from, the assignment of gray scale information to each of the regions of the image.

In order to display the image with color information on a display device, in the present embodiment, it is necessary to "move" the color information in upper-upper memory storage structure 14 into the memory space of upper memory storage structure 16. This is necessary because the present embodiment only operates on 12 bits of image information for display purposes. It will be understood by those skilled in the art that a system designed to handle a greater number of bits of display information could display color information as well as the raster represented "ghost" bit plane images. This operation is accomplished in the present embodiment by swapping the color information into the memory storage locations of the "ghost" bit planes.

There is shown in FIG. 2 an illustration of the use of bit planes 16a-16d of upper memory storage structure 16. Sequence A of FIG. 2 shows the image (as a series of four "X" characters) displayed in graphics bit plane 12. The image shown in graphics bit plane 12 of Sequence A is created by the animator and is represented in a vector file of vector storage structure 22 as a set of vector values. The animator then stores the image in one of the bit planes of upper memory storage structure 16. The animator can select any of the 4 bit planes of upper memory storage structure 16. In Sequence A, the image is stored in bit plane 16a.

Sequence B shows the image from bit plane 16a displayed on a display device 9. Additionally, a second image representing movement of the first images (shown as a series of four "X2" characters) is drawn by the animator in graphics bit plane 12 (not shown). The new image is stored as a vector file in vector storage structure 22, but represented as a raster image in graphics bit plane 12 (and displayed as such on display device 9). For purposes of distinction, each of these images is displayed in a different color and possibly a different intensity on the animator's display monitor 9. This is due to each bit plane of upper memory storage structure 16 having a different color assigned to it. Graphics bit plane 12 (raster representation of the vector information of the image) also has a color assigned to it which should be different than those colors assigned to the bit planes of upper memory storage structure 16.

After drawing the second image in Sequence B (using the image from bit plane 16a as a reference), the second image is stored in bit plane 16b of upper memory storage structure 16. In Sequence C, the original and new images are both displayed on display device 9 (in the colors assigned to their respective bit planes), and the animator can draw in the third image in graphics bit plane 12 (not shown). This third image (shown as a series of four "X11" characters) represents the "in-between image" of the first and second images. The first and second images are displayed in their respective colors on display device 9 to allow the animator to draw in the third image (in graphics bit plane 12) in the proper position. The animator can then store this third image in a third bit plane, shown as bit plane 16c in Sequence C of FIG. 2.

Each of the raster bit planes 16a, 16b, and 16c represent the image to be animated as it would appear in three separate frames of an animation sequence. Therefore, when assigning gray scale information to these respective images, the gray scale information is stored in a different memory storage structure 17 for each frame. In this way, the image stored in bit plane 16a is assigned a gray scale value, and then the gray scale value is stored in a lower memory storage structure 18 for that frame. The image in bit plane 16b is assigned a gray scale value, and then this gray scale information is stored in a lower memory storage structure 17 for a subsequent frame. Lastly, the image in bit plane 16c would be assigned a gray scale value, and this gray scale information would be stored in a lower memory storage structure 18 for a third frame. Unless the animation "story" requires different colors or effects for the same image over several frames, the gray scale values should be the same for all three frames.

The storage of the gray scale information in lower memory storage structure 18 for each of the bit planes 16a, 16b and 16d, is illustrated in FIG. 3. In A of FIG. 3 (corresponding to Sequence A of FIG. 2), an arbitrary gray scale (for purposes of illustration) represented by the binary value of eight ones (1 1 1 1 1 1 1 1) is repeated for the four pixels illustrated by the shaded area.

In B of FIG. 3 (corresponding to Sequence B of FIG. 2), the arbitrary gray scale value of the eight ones is shown and covers the four pixels represented by the shaded area.

In C of FIG. 3 (corresponding to Sequence C of FIG. 2), the arbitrary gray scale value of four ones and is shown and covers the four pixels represented by the shaded area.

For this example, then, the animation of the images would appear as a transition of the X characters in their location in the first frame to their location in the second and third frames. In the three frames of this animation sequence, each of the images is assigned the same gray scale value.

The final animation product could yield each of the images in a different color. In that case, it would be necessary to assign each of the regions, represented by the gray scale values, a different color.

There is shown in FIG. 4 a representation of the color information for the images drawn in Sequences A, B and C of FIG. 2 and stored in the upper-upper memory storage structure 14. Structure A of FIG. 4 shows the color information for the image drawn in Sequence A of FIG. 2. An arbitrary value (for purposes of illustration) of four ones (1 1 1 1) is stored in the bit planes of the shaded area. B and C of FIG. 4 show similar storage for the corresponding images from FIGS. 2 and 3.

Look-up tables (not shown), a selected one of which is defined for each color region by an identifier, define color transfer functions corresponding to the values stored in the bit planes for each pixel in A, B and C of FIG. 4. This information, along with the 8-bit gray scale information (stored in lower memory storage structure 18), provides for a unique output color for each color pixel. This, in turn, results in the color being applied in the final image displayed on display device 9, which is dependent upon, but not a mere summation of, gray scale values and operator-selected colors for the various regions of an image. In the present example of FIGS. 2–4, only one color is being assigned to all images. Combining these images, as a sequence of images, results in the final animation or animated feature.

The information that is used for the production of the final, colored animated images is contained in lower memory storage structure 18, upper-upper memory storage structure 14, and the look-up tables (not shown) for each of the color regions (colors) which can be assigned to areas of the images.

The vector information is no longer necessary once the unfilled images are satisfactory to the animator and completed. The information in graphics bit plane 12 is temporary, corresponding to that displayed on the display device at any given time. The raster representation of the images stored in the bit planes of upper memory storage structure 16 is also temporary, designed to facilitate the drawing and creation of the animated images. Once this is completed and gray scale information for the images is stored in lower memory storage structure 18, the information in upper memory storage structure 16 is no longer required.

Figure 5:
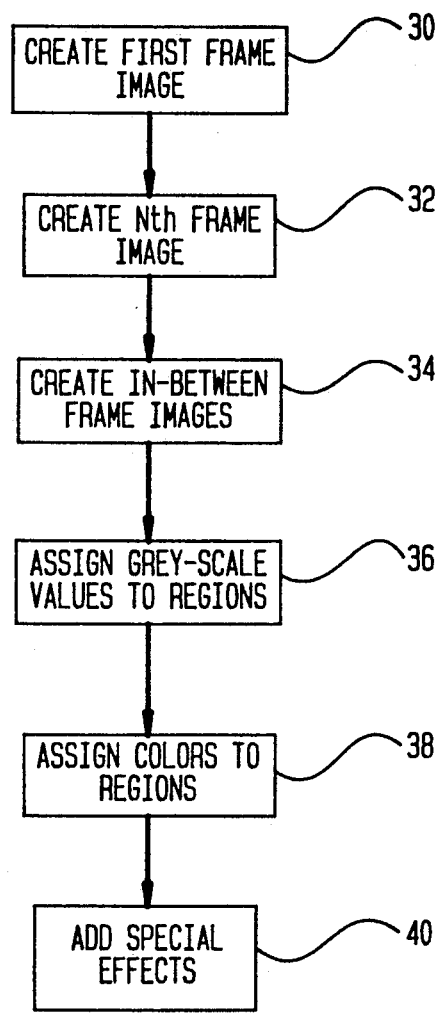
FIG. 5 is a flow diagram of the animation process of the present invention.

There is shown in FIG. 5 an illustration of the animation process of the present invention in the form of a flow chart, with block 30 representing the creation of the first animation frame image and block 32 representing the creation of the Nth frame image. Typically, the Nth frame image is the ninth frame for image animation. The creation of in-between frames based on the first frame and the Nth frame is represented by block 34. As described, the Nth frame is the second frame created, and the in-between frame is the third frame created. Block 36 represents the assignment of gray scale values to regions, wherein the regions are defined by the image outlines. Block 38 represents the assignment of colors to the regions where gray scales were assigned in block 36. Blocks 36 and 38 can be combined into one simultaneous step. Block 40 represents the addition of special effects, including the combinations of images and layering of images.

Figure 6:
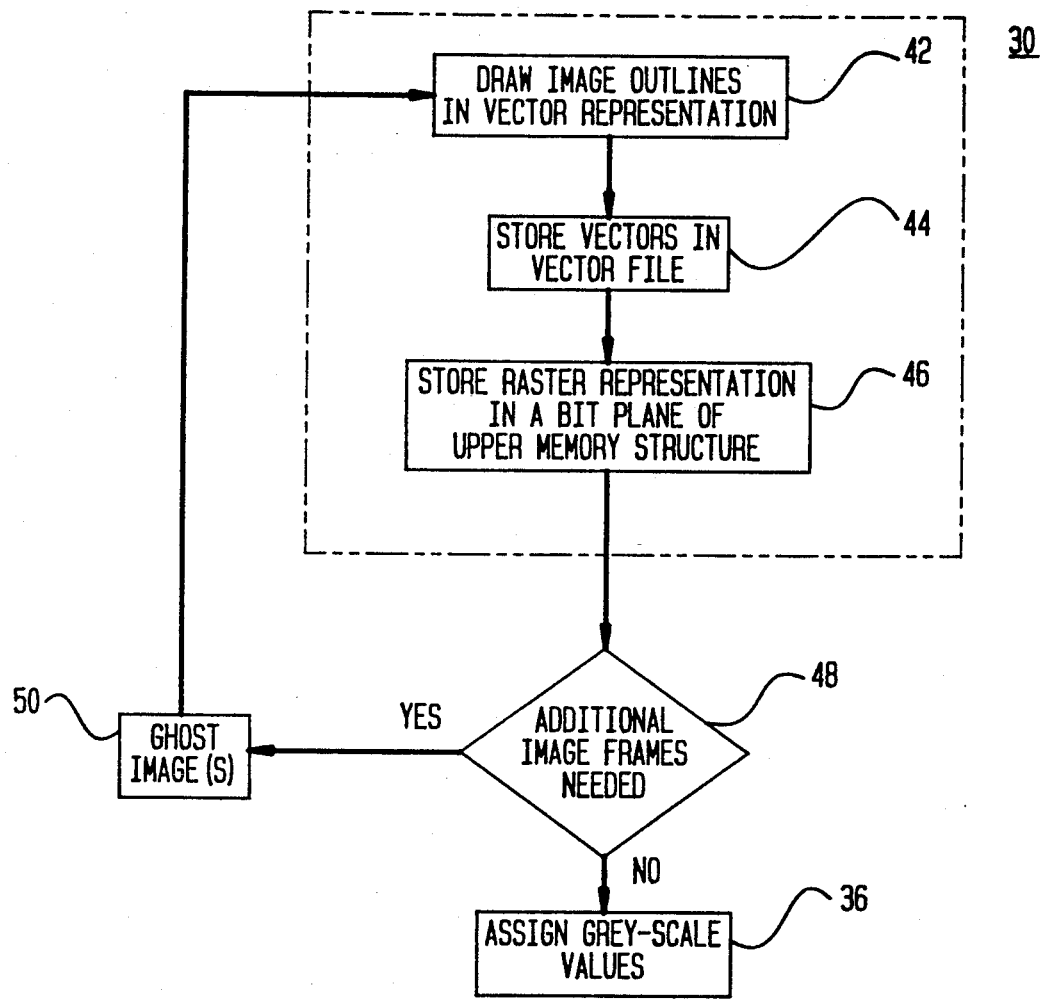
FIG. 6 is a more detailed flow diagram of the first three steps illustrated in FIG. 5.

There is shown in FIG. 6 a more detailed schematic of the steps represented by blocks 30-34. As indicated in FIG. 6, an animator begins, in block 42, by creating the image outlines for an image to be animated. This information is stored in a vector file in vector storage structure 22. By drawing the images in vector representation, the animator has the ability to modify and manipulate the images through such techniques as rotation, stretching, shrinking, duplicating, etc. For this reason, image information in vector representation is stored in a vector file as shown in block 44 should image modification or adjustment be necessary at a later time.

Once the image is satisfactorily created, the image is stored in raster representation (as a bit map) in one of the bit planes of upper memory storage structure 16. As previously described, each bit plane of upper memory storage structure 16 has associated with it a particular color and intensity to differentiate between frames. In the present embodiment, the storage of vectors in a vector file in vector storage structure 22 is carried out at the time that the image is stored in raster representation in one of the bit planes of lower memory storage structure 18. It is possible, however, to store the vector information at a separate time than that of the raster information.

At this point, one image outline has been created in a vector representation and stored in a raster representation in upper memory storage structure 16. The next step for the animator is to create a second image corresponding to where the image just created will be located after "motion" has taken place. Typically, this second frame is the ninth frame in a sequence of animated images. In FIG. 5, this is referred to as the "Nth" frame. Deciding whether this step is necessary is shown in decision block 48.

In order to provide proper relationship of the first image to that of this second image, the animator can display the first image in the color of the bit plane in which it is stored. This color should be different than the color in which the animator is displaying the vector represented image (in graphics bit plane 12) that is currently being created. This is referred to in block 50 as the ghosting of images.

By ghosting (displaying the images from upper memory storage structure 16), the animator can draw the current image using the ghosted image as a reference. This greatly aids in the production of high-quality and accurate animation. To draw the second image (i.e., the ninth frame), the animator goes back to block 42 and draws a new image.

When complete, the animator stores the raster representation of this second image in its appropriate lower memory storage structure 17. But for its appropriate frame, all ghosted images can be displayed in the same plane within their respective frames. During ghosting, each ghosted image is assigned to the frame being in-betweened, for reference purposes only. The ghosted frame is not saved to memory storage structure 17 where the new in-between image is stored.

The in-betweening is represented in FIG. 5 as block 34. The process for in-betweening is identical to that described earlier for creating the first and second images. The difference is that this is a further iteration of the process as already described. At block 50, where images are ghosted, there would now be at least two images displayed, in different colors corresponding to the bit planes of upper memory storage structure 16, in which they have been ghosted to. The animator uses both ghosted images to serve as references in order to draw an image which shows motion between the ghosted images. It is understood that there is not a limitation of only ghosting two images. Any number of image layers (limited only by the number of bit planes in upper memory storage structure 16) could be ghosted as an aid to the animator When all frames (frames 1-9, for this example) have been created, gray scale values can be assigned to the regions of the images which are selected by the animator, as shown in block 36.

Figure 7:
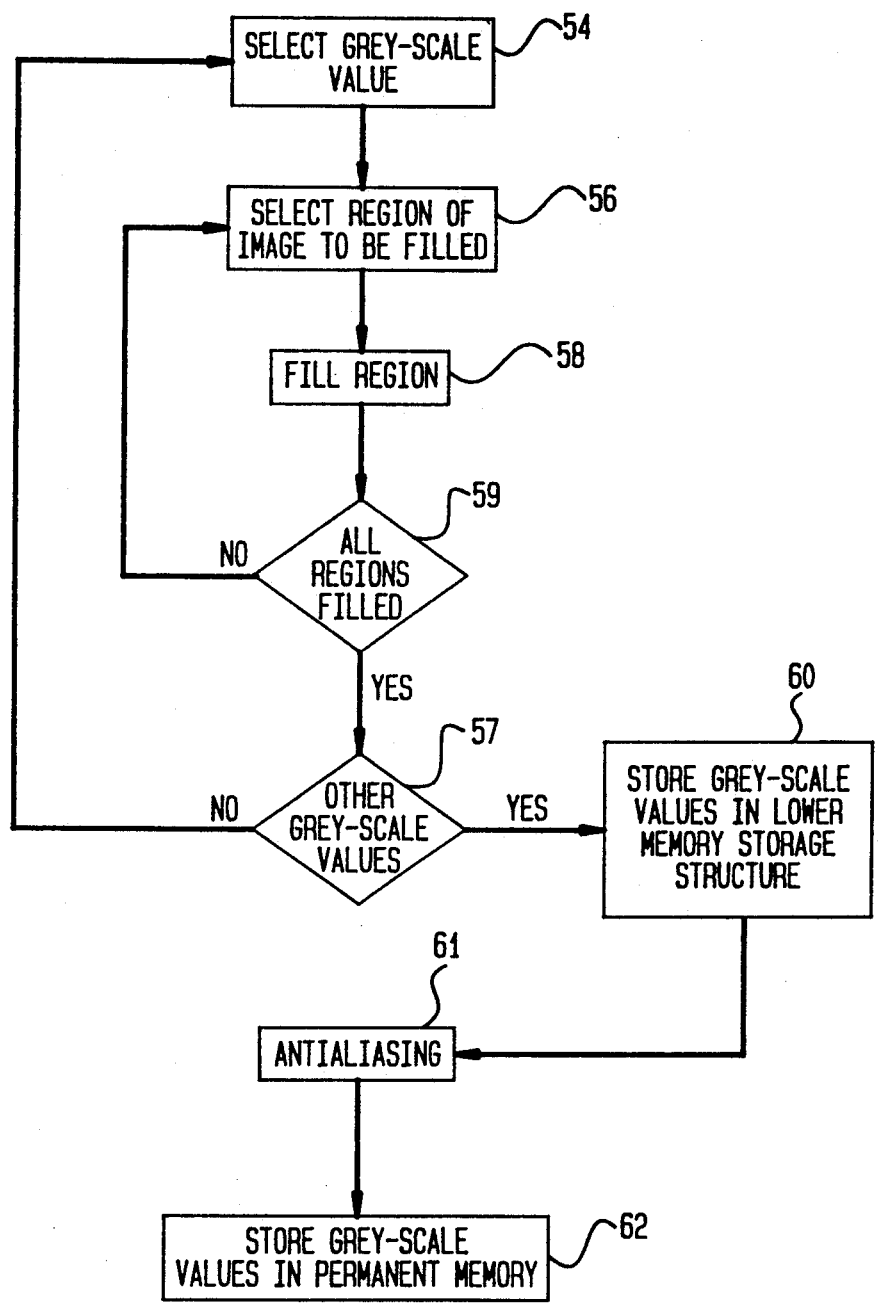
FIG. 7 is a more detailed flow diagram of the gray scale assignment process.

There is shown in FIG. 7 a flow diagram of the gray scale assignment process 36. In block 54, it is shown that the animator selects a gray scale value which he or she desires to assign to a region of an image. In animation, a region is typically any area surrounded by the lines of the image. The inside of a circle is an example of a region, as is the area outside the circle.

Block 56 shows the animator selecting a region of an image to be filled with the gray scale values selected in block 54. Typically, an image contains several areas or regions which will eventually receive different colors. An example of this would be a cartoon figure wearing clothing having different colors. Two hundred fifty-six gray scales can be achieved in one image, but only 16 regions in the present embodiment.

In block 58, the selected region is filled with the selected gray scale value. In the present embodiment, the animator will immediately see the gray scale appear in the selected region on the display device. In decision block 59, it is determined whether all gray scale values have been selected. If not, the next gray scale value must be selected in block 54. Blocks 54-58 are repeated for all of the regions in a particular frame. In this way, different gray scale values are assigned to all of the regions of a frame. There may be several different gray scales for each region. Once this is complete, the gray scale values are stored in lower memory storage structure 18, as shown in block 60. In the present embodiment, this is an eight-bit value stored for each pixel corresponding to a possible selection of 256 gray scale values.

As it is possible to combine animation with live-action images or background images created prior to animation, lower storage structure 18 is not always "empty" before the gray scale values are stored there. It is possible that other image information, such as a digitized live-action image is already residing there. It is also possible to circumvent the upper memory storage structure 16 and store the raster representation of the vector-based images being created directly into lower memory storage structure 18. In any case, the gray scale values assigned in FIG. 7 are stored in lower memory storage structure 18, and overwrite the location of any information previously stored there.

Further, if lower storage structure 18 is "empty", a uniform gray scale value is stored for all non-image pixels. In the present system, a gray scale value of 128 is selected and stored.

Once the gray scale information is stored in lower memory storage structure 18, and the animator is satisfied with the region and gray scale selection, this raster gray scale information is anti-aliased in block 61 and then stored in a permanent memory location (i.e., hard disk, removable storage media, etc.), as shown in block 62. Anti-aliasing typically takes place on the designated background to provide proper fusing of images. This can occur after storage of all information in lower memory storage structure 18, or after lower memory storage structure information is stored for several frames.

As already described, it is necessary to provide gray scale information in lower memory storage structure 18 for each frame. This means that each frame has gray scale values stored in its own lower memory storage structure 18.

Figure 8:
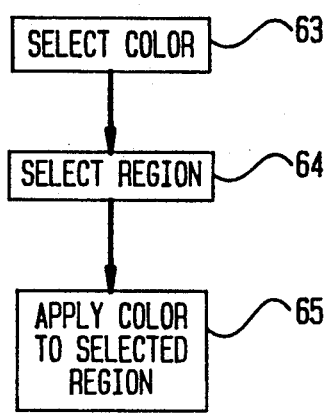
FIG. 8 is a more detailed flow diagram of the color assignment process.

There is shown in FIG. 8 a flow chart representation of the assignment of colors 38. In block 63, a color is selected for a particular region which is not yet designated. An example of this would be selecting red for application to a cartoon character's dress. In block 64, a region is selected to which this color is to be applied. It is possible to designate a color at the time a gray scale is applied to the region, as was described in FIG. 7. In doing so, it is understood that a particular color is selected and associated with a particular gray scale. This can be done prior to the selection and application of the gray scale to a particular region, so that gray scale and color are thus applied simultaneously to a region. Color can also be applied after the selection and application of the gray scale to a particular region. In any case, it is necessary to designate a region to which a color is to be applied. The color is applied to the selected region in block 65.

In the presently preferred embodiment, a color will typically be applied at the time that a gray scale is applied to a region. The present embodiment, however, does not provide for displaying gray scale information concurrent with color information. Thus, in order to display the color information, the animator must choose an option for solely displaying color. This is not a limitation of the present system, as it is readily understood that additional information can be used in systems operating on more information to allow for display of color as well as gray scale information and image modification information.

Colors are selected in the present embodiment by using a color bar on the display device. In the present embodiment, these colors are selected prior to the animation process, as the palate from which the animator colors each region. This facilitates efficient and consistent coloring in a production-type animation process.

The animator designates which regions receive a certain color by pointing to a color wheel displaying colors. In the present embodiment, these colors are generated by a 24 bit color generating board, such as the Targa Board ®. The colors are then locked into a color bar. The color bar is used by the designer and colorist for completing the production coloring. After the colors are selected, they appear on the side of the menu used for filling the colors. Colors are chosen for all regions, and the color bar is passed on as data to all persons carrying out the coloring in later stages of production.

Figure 9:
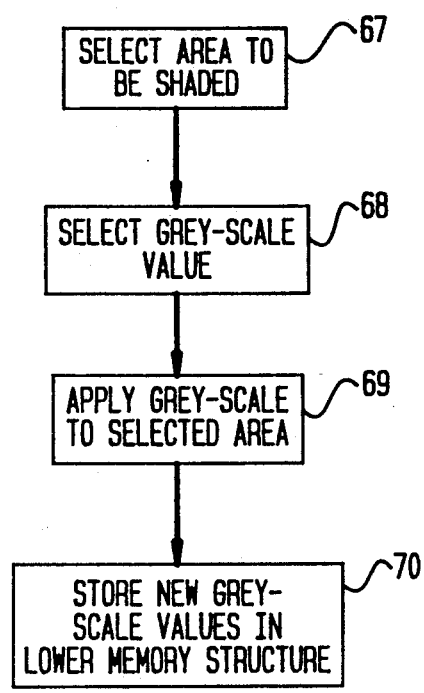
FIG. 9 is a flow diagram of the shading special effect.

There is shown in FIG. 9 a flow chart for the process of applying a shading special effect. Shading is an operation which assigns a particular gray scale (and corresponding color) to an area designated by the animator, called the active mask. This allows the animator to provide an effect such as a black shadow or the assignment of gray scale values to a region not defined by the outlines of an image.

To produce this effect, an animator selects an area to be shaded in a first step, represented by block 67. This is accomplished through the region selection tools such as a window or a free-hand designated region. In the second step, represented by block 68, the animator selects a gray scale value to be applied to this region. Typically, this is a black or very dark gray scale. In the next step, block 69, the gray scale is applied to the selected area. The selected area is also referred to as a designated mask or active mask. Note that the application of the selected gray scale information to the selected area will overwrite the underlying gray scale information in that entire area. In block 70, the new gray scale values are stored in lower memory storage structure 18, overwriting any prior values stored there. Again, this tool is effective for blackening out (or, conversely, whitening out) sections or areas of the screen.

Figure 10:
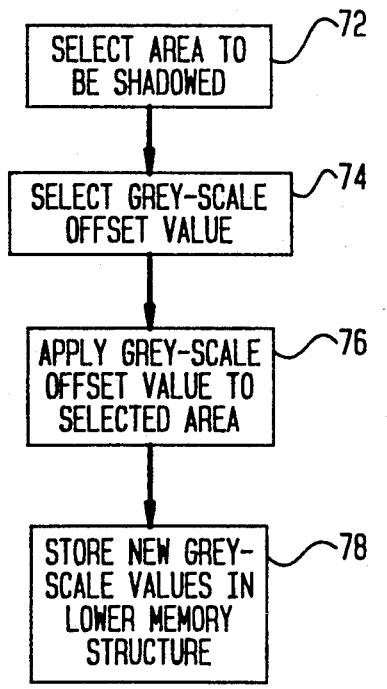
FIG. 10 is a flow diagram of the shadowing special effect.

There is shown in FIG. 10 a flow chart of the process for providing a special effect of shadowing, in accordance with the preferred embodiment of the present invention. A shadow is different than a shade (FIG. 9) in that the underlying gray scale is not replaced by a selected gray scale value, as is done in shading. In shadow, the underlying gray scale pixel values are offset by an operator designated value. In this way, the underlying pixels will be adjusted upward or downward according to this offset value.

For shadowing, the animator selects an area to be shadowed, in a first step represented by block 72. Again, this is accomplished through any number of tools, such as windows or free-hand area designation. In the next step, represented by block 74, a gray scale offset value is selected. This value is either positive or negative, reflecting an increase or decrease, respectively, of the underlying gray scale values of the designated region. The gray scale offset value is then applied to the gray scale values located in the selected area, block 76, and, finally, the new gray scale values are stored in lower memory storage structure 18, block 78.

This tool provides the realistic effect of causing the underlying surface be reflected as either a darker or lighter image, as is the case in many real life shadows.

Figure 11:
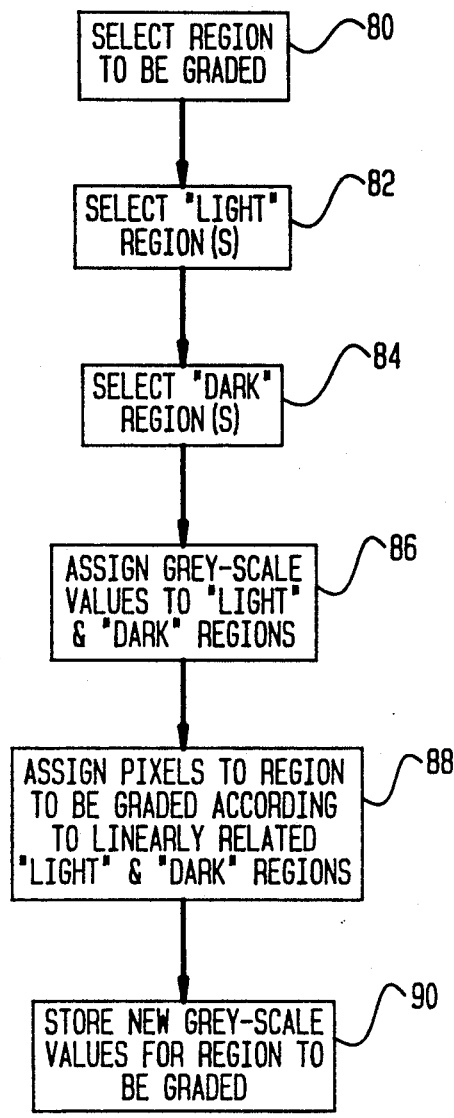
FIG. 11 is a flow diagram of the gradient shading special effect.

There is shown in FIG. 11 a flow chart for the process of providing the grading special effect, another feature of the preferred embodiment of the present invention. The grading of an image involves the production of a gradation of gray scale values for an intermediary region based upon the gray scale values in adjacent operator-selected regions.

To begin, the region which is desired to be graded is selected, block 80. This can be accomplished with any of the selection tools such as windows, free-hand drawing, connection of operator-selected vertices, etc. Next, as represented by shown blocks 82 and 84, the "light" and "dark" regions are selected. Light and dark are only used as labels to distinguish the gradient intensity and direction of two gray scales from which the region to be graded is derived. The selection of light and dark regions is not limited to one region apiece. As the light and dark regions only refer to the gray scale values from which the region to be graded is derived, the animator can position multiple light and dark regions around the region to be graded. These light and dark regions can be positioned randomly around or adjacent to the region to be graded.

In block 86, gray scale values are assigned to the light and dark regions. These are the values from which the region to be graded will be derived. Note that the labels "light" and "dark" refer to a "light" region having a gray scale value which is less than that of the "dark" region. These are merely labels to distinguish the lower gray scale value region from the higher gray scale value region.

In the step represented by block 88, the pixels in the region to be graded are assigned gray scale values based upon the linear relationship between the light and dark regions.

The light and dark regions can be placed exactly opposite each other (on opposite sides of the region to be graded), or can be positioned anywhere between 180° and 0°. As the light and dark regions approach each other (i.e., approach 0° apart), the effect that they have on the region to be graded diminishes.

This results in the farther apart (closer to 180° apart) from each other that the light and dark regions are placed, the greater the visual changes in the region to be graded.

Placing multiple light and dark regions around the region to be graded achieves more variation effects in the region to be graded. Each of these multiple light and dark regions may be thought of as subdivisions of the light and dark regions, respectively.

The grading occurs by operating on each pixel in the light region with respect to each pixel in each dark region that is linearly related through the region to be graded to that pixel in the light region. Linearly related refers to the relationship between the light and dark pixels and the region to be graded. At least one pixel in the region to be graded must be within a line segment extending between at least one pixel in each of the light and dark regions. Absent this linear relationship, there will be no pixels in the region to be graded or which will undergo grading.

Similarly, each pixel in the dark region is operated upon with respect to each pixel in the light region that is linearly related through the region to be graded to that pixel in the dark region. These operations occur for each pixel in each light and dark region with respect to each pixel in the opposite contrast region that has a linear relationship through the region to be graded. The necessity for a linear relationship between light and dark region pixels is why placing a light and dark region adjacent to each other without the region to be graded between the light and dark region results in no grading of the region to be graded. Also effecting the grading is the distance between the light and dark regions and their angular relationship.

Once the region to be graded has gray scale values assigned to it, the new gray scale values are stored in lower memory storage structure 18, as shown in block 90.

The actual grading process operates by determining the difference in gray scale values between the light and dark regions. A light region with a gray scale value of 150 and a dark region with a gray scale value of 50 yields a difference of 100. Next, the number of pixels which are linearly between the light and dark regions is determined. The difference in gray scale values between the light and dark regions is then "ramped" according to the number of pixels linearly between the light and dark regions. If there are 100 pixels between the light and dark regions, and the light and dark regions have gray scale values of 150 and 50 respectively, then each pixel between a pixel in the light and a pixel in the dark regions would be incremented by one. This would result in the "between" pixels having values of 51, 52, 53 ... 147, 148, 149. These between values are then added to the appropriate gray scale values in the region to be graded. Thus, if the region to be graded has a length of 50 pixels in a line between a pixel in the light region and a pixel in the dark region, and the region to be graded was located 50 pixels for the light region, then the region to be graded would have a gray scale value of 101 added to the pixel within the region to be graded which is closest to the dark region. The gray scale of 102 would be added to the gray scale value of the next pixel within the region to be graded. This continues until all pixels in the region to be graded have offset values added to their underlying gray scale values. If the region to be graded has a gray scale value of 10 for all of its pixels, this would be added to gray scale values of 101 ... 150 for the respective pixels.

The new gray scale values are assigned to all pixels inside the region to be graded. Regions which are either outside the region to be graded or not linearly between the light and dark regions are not affected. All linear relationships between light and dark regions (through the region to be graded) are determined on a pixel pair basis; i.e., a pixel from the light region must be linearly related (through the region to be graded) to a pixel in the dark region.

Multiple grading occurs when pixels in the region to be graded are linearly between multiple pairs of light and dark regions (or effective light and dark regions, due to overlap). These pairs need not be comprised of unique pairs, as many to one relationships may exist. This is handled sequentially by ordering the grading of multiple light and dark region pairs.

Figure 12:
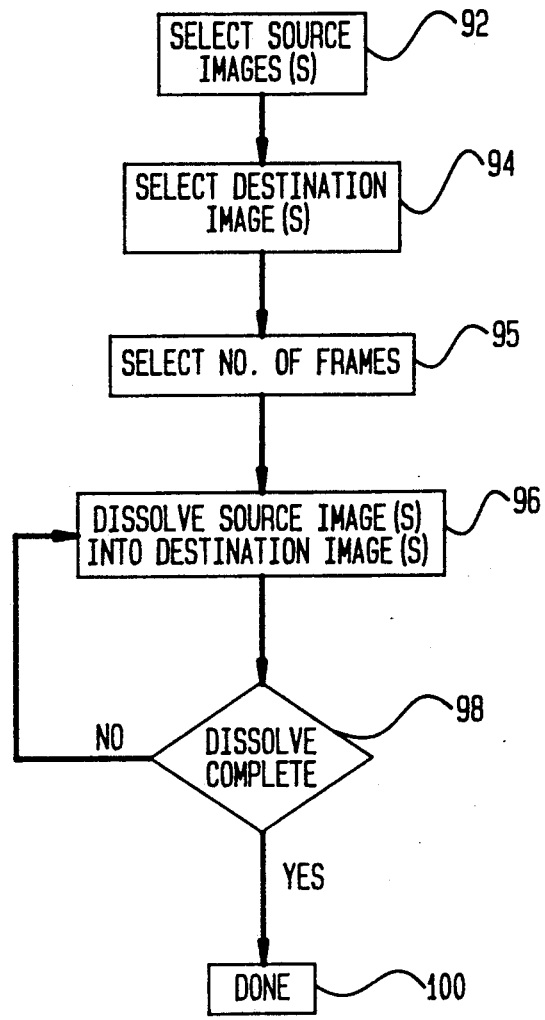
FIG. 12 is a flow diagram of the dissolve special effect.

There is shown in FIG. 12 a flow chart illustrating the dissolve special effect. The dissolve effect allows for the dissolving or fading in and out of one image into another. This also can take place over multiple images.

In block 92, the source image or images to be faded in or out of an image are selected. In block 94, the image from which the fading in or out it so occur is selected. In block 95, the number of frames over which the dissolve takes place are selected.

Block 96 shows the dissolving of the source image(s) into the destination image(s). The dissolve takes place over the number of frames selected in block 95. This is reflected as a percentage. For example, if ten frames are selected, ten percent of the source image pixels will dissolve into the destination frame. This will continue through until the dissolve is complete.

Once the dissolve is complete, the process is done, as shown in block 100. Until the dissolve is complete, the process loops back and greater and greater amounts of the source image are faded in (or faded out of) the destination image until the dissolve is complete.

This is a very useful tool for a gradual transition from scene to scene, or the appearance of characters such as ghosts.

Figure 13:
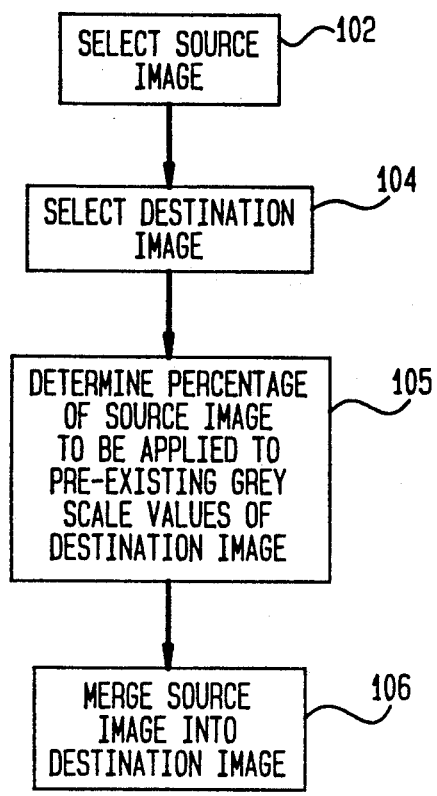
FIG. 13 is a flow diagram of the merge special effect.

There is shown in FIG. 13 a flow chart illustrating the merge special effect. The merge effect is similar to the dissolve, except the transfer from source to destination occurs in only one frame at a preselected percentage of the gray scale value of the source pixels.

Merging allows for transparent effects such as images appearing through fire or smoke and also reflections of images. Examples include a person's image (source) reflected on a tile floor (destination) whereby the tile floor is discernable through the reflected (transparent) source image.

Figure 14:
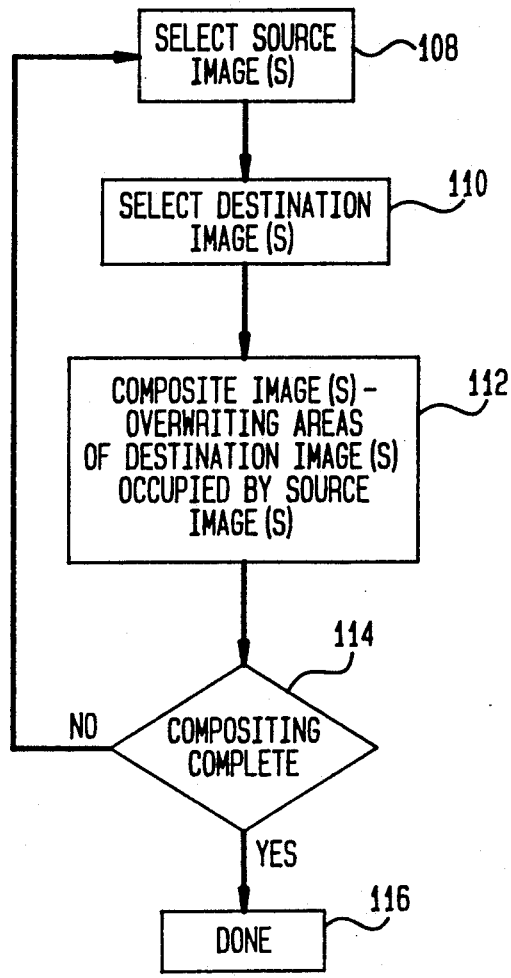
FIG. 14 is a flow diagram of the composite special effect.

There is shown in FIG. 14 a flow chart illustrating the composite special effect. The composite special effect works in the manner of cell animation. This allows the creation of several layers which are composited together to form a final image. This is often the case in animation, and allows for the creation and production of various parts of a complete animation sequence or a part of a character. For instance, this tool allows the animators to isolate an image or a part of an image and create animation for those individual images or parts of images. This "sub-animation" can then be composited into the other image or part of the image. An example of this is animating blinking eyes separately from the face in which the eyes are to appear. Through each frame of a sequence, a different "blink" of the eyes would be composited into the image of the face. Over the entire sequence, the blinking or complete blinking of the eyes would be present in the face of the image. Another example is having one animation group working on the background while another works on the foreground, a third on the primary character, and a fourth on secondary characters. All of these "layers" need to be brought together (composited) for the final production.

The composite tool completes an absolute transfer from the source image to a destination image. In block 108, the source image or images are selected. In block 110, the destination image or images are selected. In block 112, the images are composited, with the source images overwriting any memory locations occupied by the destination images.

Compositing can be done so that the source image is only transferred to areas where there are no pre-existing masks or masks of non-assignable pixels. In this way, a character walking behind another character will appear to walk behind the character instead of having portions of the character intermingled with each other as if they were transparent. If the compositing is complete, the process is finished. If not (there are additional layers to composite), the process cycles back to block 108.

The animator must, of course, decide the order of compositing so that a character who is to appear in front of a background will not have portions of it overwritten by corresponding areas of the background image.

Figure 15:
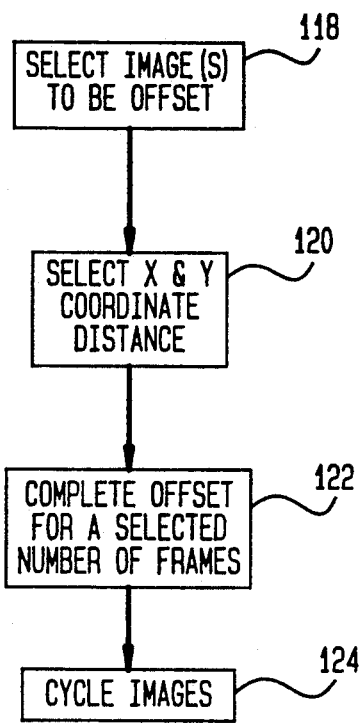
FIG. 15 is a flow diagram of the pixel offset process.

There is shown in FIG. 15 a flow chart illustrating the process for the pixel offset special effect. This tool allows an animator to pan background images across a series of frames, producing the effect of motion of these background images. Many images can be set along a predetermined trajectory, such as clouds sliding across the sky. Using the pixel offset tool, the clouds can be translated over an X and Y coordinate distance and rate pre-set by the animator. This occurs from frame to frame and can be cycled after the images have left the "boundaries" of the screen. The velocity of pixel offset can be modified so that there is a slow in and out of the apparent motion of an element moving across the screen. Also, the trajectory of movement can be programmed into the pixel offset operation.

In block 118, the image to be offset is selected. In block 120, the X and Y coordinates for the offset distances are selected. In block 122, the offset is completed. This translates into the image moving across the screen. Finally, in block 124, the option of cycling the images once they have left the screen back to the other side of the screen is accomplished. This allows images to "wrap around" to the beginning of the next frame.

Figure 16:
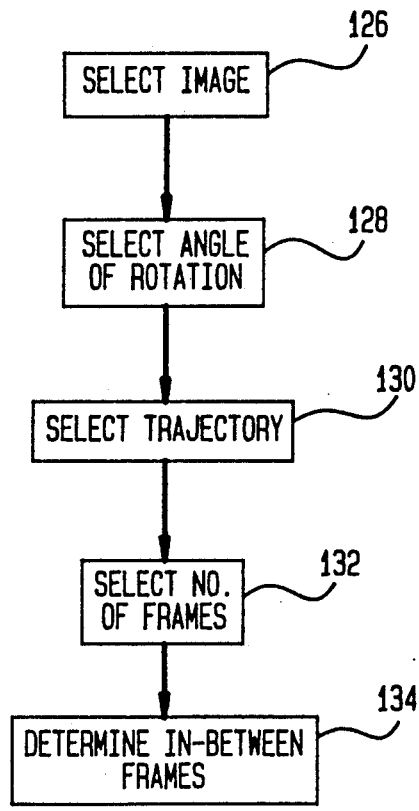
FIG. 16 is a flow diagram of the automatic in-betweening process.

There is shown in FIG. 16 a flow chart illustrating the auto-in-betweening special effect. This tool is useful where characters or images are moving along a predetermined trajectory or through a predetermined rotation, all at a relatively constant rate. An example of this concept is a character that tumbles across a screen. Another example is the movement of a character's arm, or leg, or head, etc. Any predictable motion can be determined by this tool.

In block 126, the image (or a portion of an image) to be auto-in-betweened is selected. In block 128, the angle of rotation around a fixed point is selected. In block 130, the trajectory of the image is selected. Note that, if an image is not rotating, only a trajectory will be selected. Conversely, if an image is rotating without moving, only an angle of rotation will be selected. It is also possible to select particular locations instead of supplying measurements for the distances that the images are to move across. In block 132, the number of frames in which the motion is being undertaken are selected. Finally, in block 134, the in-between frames are determined by the system.

The blurring function allows an animator to blur or soften colors by averaging gray scale values of selected numbers of pixels. When a portion of an image is selected (i.e., a "rosy" cheek on a face), an active mask is set up consisting of the portion to be blurred and the surrounding area of the image where the blur will fade into. An example would be designating an outline of a face without eyes, nose, etc., but with the cheeks to be blurred as a mask.

This mask is displayed in graphics bit plane 12. Next, the parts of the image which are not part of the mask are displayed in graphics bit plane 12 in their proper position on the mask. This means that the eyes, nose, etc., are displayed on the face. Next, a value is selected corresponding to the number of pixels on either side of a pixel undergoing the averaging which are to be included in the processing. Then, for each pixel displayed, an average of the gray scale values of a selected number of adjacent pixels is made and assigned to the pixel being processed. These new gray scale values are only stored for pixels within the active mask, i.e., for the cheeks and surrounding pixels in which there are new gray scale values as a result of the blurring (softening).

What is claimed is:

1. A computerized animation system, comprising means for creating a series of images, each image defined by a set of vector values and means for storing said series of images in a memory structure for storing image information, means for displaying said images as a plurality of pixels and said memory structure comprising a plurality of bit planes and sub-divided into at least two storage structures, a first storage structure in which is temporarily stored operator-modified image information as a set of vector values and a second storage structure comprised of at least one bit plane, in which is stored a raster representation of said operator-modified image information in said at least one bit plane of said second storage structure.

2. The computerized animation system of claim 1 wherein said image stored in said first storage structure is displayed on a display device in an operator-selected color.

3. The computerized animation system of clam 1 wherein said second storage structure is comprised of four bit planes.

4. The computerized animation system of claim 3 wherein each of said images stored in each of said bit planes is displayed in an operator-selected color associated with said bit planes.

5. The computerized animation system of claim 1 wherein the image stored in said bit planes is displayed on a display device in an operator-selected color.

6. A computer-based method for creating animated images comprising the steps of:

a) creating and displaying a first image, said first image comprised of vector-defined lines and stored as a set of vector values in a first memory location of a vector storage structure;
b) converting said first image into a raster defined image and temporarily storing said first image in a first memory location of a first raster storage structure as a raster-defined image;
c) creating and displaying a second image, said second image comprised of vector-defined lines and stored as a set of vector values in a second memory location of said vector storage structure;
d) converting said second image into a raster defined image and temporarily storing said second image in a second memory location of said first raster storage structure as a raster defined image;
e) creating and displaying a third image representing a transition from said first image to said second image, said third image comprised of vector-defined lines and stored as a set of vector values in a third memory location of said vector storage structure; and
f) converting aid third image into a raster defined image and storing said third image in a third memory location of said first raster storage structure as a raster defined image.

7. The method of claim 6 wherein said first image is displayed while said second image is created.

8. The method of claim 6 wherein said first image and said second image are displayed simultaneously while said third image is created.

9. The method of claim 8 wherein said displayed first image is displayed in a different color than said second image.

10. The method of claim 9 wherein said displayed first image is displayed in a first color, said displayed second image is displayed in a second color, and said third image is displayed in a third color.

11. The method of claim 6 further comprising the step of repeating steps a) through f) with said third image created in step e) becoming a new first image.

12. The method of claim 6 further comprising the step of repeating steps a) through f) with said third image created in step e) becoming a new second image.

13. The method of claim 6 wherein the temporarily stored images are each stored in separate second raster storage structures with a gray-scale value assigned to each bit plane.

14. The method of claim 13 wherein each separate second raster storage structure corresponds to one frame of an animated sequence of images.

15. The method of claim 14 wherein the images stored in the separate second raster storage structures are cycled and displayed on a display device to show animation.

16. The method of claim 15 wherein the cycling of the images is done automatically at a preselected rate in a preselected direction.

17. A computerized animation system, comprising means for creating a series of images, each image defined by a set of vector values and means for storing said series of images in a memory structure for storing image information, means for displaying said images as a plurality of pixels and aid memory structure comprising a plurality of bit planes and sub-divided into at least two storage structures, a first storage structure in which is temporarily stored operator-modified image information as a set of vector values and a second storage structure comprised of at least a first and a second bit planes, in which is stored a raster representation of said operator-modified image information in first and second said bit planes of said second storage structure, wherein said image information stored in said first bit plane and said image information stored in said second bit plane are displayed simultaneously.

* * * * *